United States Patent
Brahmi

(10) Patent No.: US 11,129,001 B2
(45) Date of Patent: *Sep. 21, 2021

(54) METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

(71) Applicant: Robert Bosch GmbH, Stuttgart (DE)

(72) Inventor: Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/631,635

(22) PCT Filed: Jun. 11, 2018

(86) PCT No.: PCT/EP2018/065283
§ 371 (c)(1),
(2) Date: Jan. 16, 2020

(87) PCT Pub. No.: WO2019/015869
PCT Pub. Date: Jan. 24, 2019

(65) Prior Publication Data
US 2020/0137539 A1 Apr. 30, 2020

(30) Foreign Application Priority Data

Jul. 18, 2017 (DE) .......................... 102017212243.9
Oct. 13, 2017 (DE) .......................... 102017218318.7

(51) Int. Cl.
*H04W 16/14* (2009.01)
*H04W 4/44* (2018.01)
(Continued)

(52) U.S. Cl.
CPC ............. *H04W 4/44* (2018.02); *H04W 16/14* (2013.01); *H04W 72/14* (2013.01); *H04W 74/0816* (2013.01); *H04W 92/18* (2013.01)

(58) Field of Classification Search
CPC ... H04W 72/1231; H04W 4/40; H04W 16/14; H04W 72/1284; H04W 72/14;
(Continued)

(56) References Cited

U.S. PATENT DOCUMENTS

2014/0362780 A1* 12/2014 Malladi ............. H04W 72/1231
370/329
2015/0334643 A1 11/2015 Maaref et al.
(Continued)

FOREIGN PATENT DOCUMENTS

EP 3171650 A1 5/2017
WO 2007018697 A1 2/2007

OTHER PUBLICATIONS

IEEE 802.11P—2010 Standard IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments. Jun. 2010, 51 pages.
(Continued)

*Primary Examiner* — Mewale A Ambaye
(74) *Attorney, Agent, or Firm* — Norton Rose Fulbright US LLP; Gerard A. Messina

(57) ABSTRACT

A method for operating a network infrastructure-side network unit of a cell-based wireless communication network is provided. The method includes ascertaining a first scheduling grant message, the first scheduling grant message including an assignment of at least one sidelink resource of the first sidelink channel to the roadside network unit; sending the first scheduling grant message to the roadside
(Continued)

network unit on a downlink channel; receiving from the roadside network unit on the uplink channel an indication that the assigned sidelink resource of the first sidelink channel is occupied; ascertaining a second scheduling grant message, the second scheduling grant message including an assignment of at least one sidelink resource of a second sidelink channel in a licensed frequency range to the roadside network unit; and sending the second scheduling grant message to the roadside network unit on the downlink channel.

8 Claims, 8 Drawing Sheets

(51) Int. Cl.
*H04W 72/14* (2009.01)
*H04W 74/08* (2009.01)
*H04W 92/18* (2009.01)

(58) Field of Classification Search
CPC . H04W 84/14; H04W 92/18; H04W 72/1252; H04W 72/1257; H04W 72/12; H04W 4/42; H04W 4/44; H04W 4/46; H04W 4/48; H04W 16/00; H04W 72/1289; H04W 28/12; H04W 84/05; H04W 29/08306; H04W 29/08567
See application file for complete search history.

(56) References Cited

U.S. PATENT DOCUMENTS

| | | | |
|---|---|---|---|
| 2016/0338094 A1* | 11/2016 | Faurie | H04W 72/14 |
| 2017/0099624 A1 | 4/2017 | Baghel et al. | |
| 2017/0188391 A1* | 6/2017 | Rajagopal | H04W 74/0816 |
| 2018/0035448 A1* | 2/2018 | Gupta | H04W 72/0446 |
| 2018/0049220 A1* | 2/2018 | Patil | H04W 72/1247 |
| 2018/0049235 A1* | 2/2018 | Baghel | H04W 76/14 |

OTHER PUBLICATIONS

International Search Report for PCT/EP2018/065283, dated Dec. 13, 2018.

Intel Corporation: "LTE-V2V Coexistence With DSRC Technology", 3GPP Draft; R1-1611924 Intel—V2V DSRC, 3rd Generation Partnership Project (3GPP), Mobile Competence Centre, 650, Route Des Lucioles, F-06921 Sophia-Antipolis Cede, France, BD. RAN WG1, NR . Reno, USA; Nov. 14, 2016-Nov. 18, 2016. 2016. XP051190736, 8 pages. URL:http ://www.3gpp.org/ftp/tsg_ran/wg1_rl1/tsgr1_87/docs.

Cao Xianghui, et al., "On Optimal Device-To-Device Resource Allocation for Minimizing End-To-End Delay in Vanets", IEEE Transactions on Vehicular Tecnnology, IEEE Service Center, Piscataway, NJ, US, BD. 65, NR. 19, 2016, p. 7905-7916, XP011625784.

ETSI TS 102 687 V1.1.1 (Jul. 2011), 45 pages.

3GPP TS 36.300 V14.2.0 (Mar. 2017), 330 pages.

IEEE 802,11P—2010 Standard IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments.

ETSI EN 302 663 V1,2,0 (Nov. 2012), 24 pages.

* cited by examiner

METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

FIELD

The present invention relates to methods for operating a network infrastructure-side network unit, network infrastructure-side network units, a method for operating a roadside network unit, and a roadside network unit.

BACKGROUND INFORMATION

Present vehicles are able to exchange information with other vehicles in their vicinity (V2V: vehicle-to-vehicle). In addition, vehicles may communicate wirelessly with roadside infrastructure (V2I: vehicle-to-infrastructure). The vehicle may also communicate wirelessly with a backend server on the Internet (V2N: vehicle-to network) or with a pedestrian terminal (V2P: vehicle-to-person). This communication is also referred to overall as "vehicle-to-everything" (V2X).

The development of new functions and services in the automotive industry, for example automated driving, benefits from V2X. Traffic safety, driving comfort, and energy efficiency may be improved. This results in new products and business models for automotive manufacturers, automotive suppliers, and other service providers.

The first generation of V2X applications, to be used in the years ahead, is based primarily on use on the road. Their purpose is to provide the driver with information about the road surroundings. Vehicles periodically provide status information (for example, position, speed, acceleration, etc.) and/or event information (rescue operations, a broken-down vehicle, traffic jams). This information is generally transmitted locally in the form of text messages. This event-based information may be sent to a central network unit (base station, backend) by neighboring vehicles.

For V2X direct device-to-device (D2D) communication, there are presently two competing technologies. The first technology is based on the radio-based IEEE 802.11p standard, which forms the basis for the comprehensive Dedicated Short Range Communication (DSRC) standard in the United States and the European Telecommunications Standards Institute (ETSI) Intelligent Transport Systems (ITS) G5 standard in Europe. The second technology is based on 3rd Generation Partnership Project (3GPP) Long Term Evolution (LTE), also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with some modifications. The MAC layer is based on enhanced distributed channel access (EDCA), which is competition-based. In addition, carrier sense multiple access (CSMA) with collision avoidance (CSMA/CA) is used. CSMA/CA follows the "listen before talk" principle for minimizing collisions on the channel. When a network unit (in the present context, a vehicle) has data to transmit, it carries out a channel measurement to check whether the channel is occupied. If the channel is detected as empty, the network unit waits with the planned transmission for a randomly ascertained time, and then begins with the transmission. If the channel is occupied during the channel measurement, the network unit will carry out a backoff procedure; i.e., it awaits the next channel access for a randomly ascertained time period. The greater the number of network units that attempt to transmit in a geographical area, the greater the likelihood that a network unit delays its transmission, resulting in overall greater delays in the network. The IEEE 802.11p standard offers advantages over other WLAN standards, based on IEEE 802.11, with regard to latency and signaling complexity, and is adapted to the V2V application.

The LTE enhancement for V2X beginning with 3GPP Release 14 provides for the use of a licensed and/or unlicensed spectrum for the communication. The V2V communication is based on a direct device-to-device interface (also referred to as a sidelink interface on the physical layer). In contrast to 802.11p, the transmission takes place with cell support, i.e., is carried out by the network in a planned manner. Transmission rights are granted by a scheduler unit situated in the base station, thus avoiding collisions and minimizing interferences. The control by the base station can be carried out only in areas in which the base station signal is available (in coverage). In a case in which no base station signal is available (out of coverage), the communication takes place with predefined parameters via the sidelink.

In the course of the development of communication standards, for example starting from different applications or development activities from different technical fields, various standards may be proposed for the same frequency range. As a result, different wireless communication systems would transmit in the same frequency range, resulting in impaired performances for both technologies.

Consequently, one could formulate an objective technical object to provide a coexistence mechanism for the two different wireless communication technologies in order to equitably distribute available resources.

SUMMARY

An object of the present invention is to provide methods for operating a network infrastructure-side network unit, network infrastructure-side network units, a method for operating a roadside network unit, and a roadside network unit.

According to a first and second aspect of the present invention, an example method for operating a network infrastructure-side network unit and an example network infrastructure-side network unit are provided. A scheduling request message for the first sidelink channel in the unlicensed frequency range is received by one of the roadside network units on the uplink channel. A first scheduling grant message is ascertained, the first scheduling grant message including an assignment of at least one sidelink resource of the first sidelink channel to the roadside network unit. The first scheduling grant message is sent to the roadside network unit on the downlink channel. An indication that the assigned sidelink resource of the first sidelink channel is occupied is received by the roadside network unit on the uplink channel. A second scheduling grant message is ascertained, the second scheduling grant message including an assignment of at least one sidelink resource of the second sidelink channel in the licensed frequency range to the roadside network unit. The second scheduling grant message is sent to the roadside network unit on the downlink channel.

According to a third and fourth aspect of the present invention, an example method for operating a roadside network unit and an example roadside network unit are provided. A message for sending to a further roadside network unit is ascertained. A scheduling request message for a first sidelink channel in an unlicensed frequency range is sent to a network infrastructure-side network unit on the uplink channel. A first scheduling grant message is received by the network infrastructure-side network unit on the downlink channel, the first scheduling grant message including an assignment of at least one sidelink resource of the first sidelink channel to the roadside network unit. It is ascertained that the assigned sidelink resource of the first sidelink channel is occupied. An indication that the assigned sidelink resource of the first sidelink channel is occupied is sent to the network infrastructure-side network unit on the uplink channel. A second scheduling grant message is received by the network infrastructure-side network unit on the downlink channel, the second scheduling grant message including an assignment of at least one sidelink resource of the second sidelink channel to the roadside network unit. The message is sent to the further roadside network unit on the second sidelink channel.

According to the first through fourth aspects of the present invention, the reliability of a transmission of a message via a sidelink channel is advantageously ensured, since the second sidelink channel is used as a backup channel for the first sidelink channel. At the same time, the second sidelink channel is used as a backup channel only when the first sidelink channel is occupied. This ensures that an initial attempt is made to apply data traffic to the first sidelink channel before the second sidelink channel is used in the licensed frequency range.

The favorable first sidelink channel is thus advantageously preferably used, and at the same time, the delivery of a message is ensured via the second sidelink channel if collisions should occur on the first sidelink channel.

According to a fifth and sixth aspect of the present invention, an example method for operating a network infrastructure-side network unit and an example network infrastructure-side network unit are provided. A first group of roadside network units within the cell of the network infrastructure-side network unit is ascertained. A second group of roadside network units within the cell of the network infrastructure-side network unit is ascertained, the first group and the second group being disjoint. A first scheduling request message is received by a first roadside network unit of the first group on the uplink channel. A first scheduling grant message is ascertained, the first scheduling grant message including an assignment of at least one sidelink resource of the first sidelink channel in the unlicensed frequency range to the first roadside network unit of the first group. The first scheduling grant message is sent to the first roadside network unit on a downlink channel. A second scheduling request message is received by a second roadside network unit of the second group on the uplink channel. A second scheduling grant message is ascertained, the second scheduling grant message including an assignment of at least one sidelink resource of the second sidelink channel in the licensed frequency range to the second roadside network unit of the second group. The second scheduling grant message is sent to the second roadside network unit on the downlink channel.

According to the fifth and sixth aspects of the present invention, the reliability of a transmission of a message via a sidelink channel is advantageously improved, since the division of the roadside network units into two groups includes a distribution of the traffic on the first and second sidelink channels. Due to the grouping into the second group, roadside network units are removed from the first sidelink channel and free up resources for further network units that are not controlled by the network infrastructure-side network unit, for example ITS-G5 network units.

All aspects have the common feature that the traffic between the network units, which is scheduled by the network infrastructure-side network unit, is distributed over two sidelink channels.

Further features and advantages are below in the context of exemplary embodiments.

DETAILED DESCRIPTION OF EXAMPLE EMBODIMENTS

Figure 1:
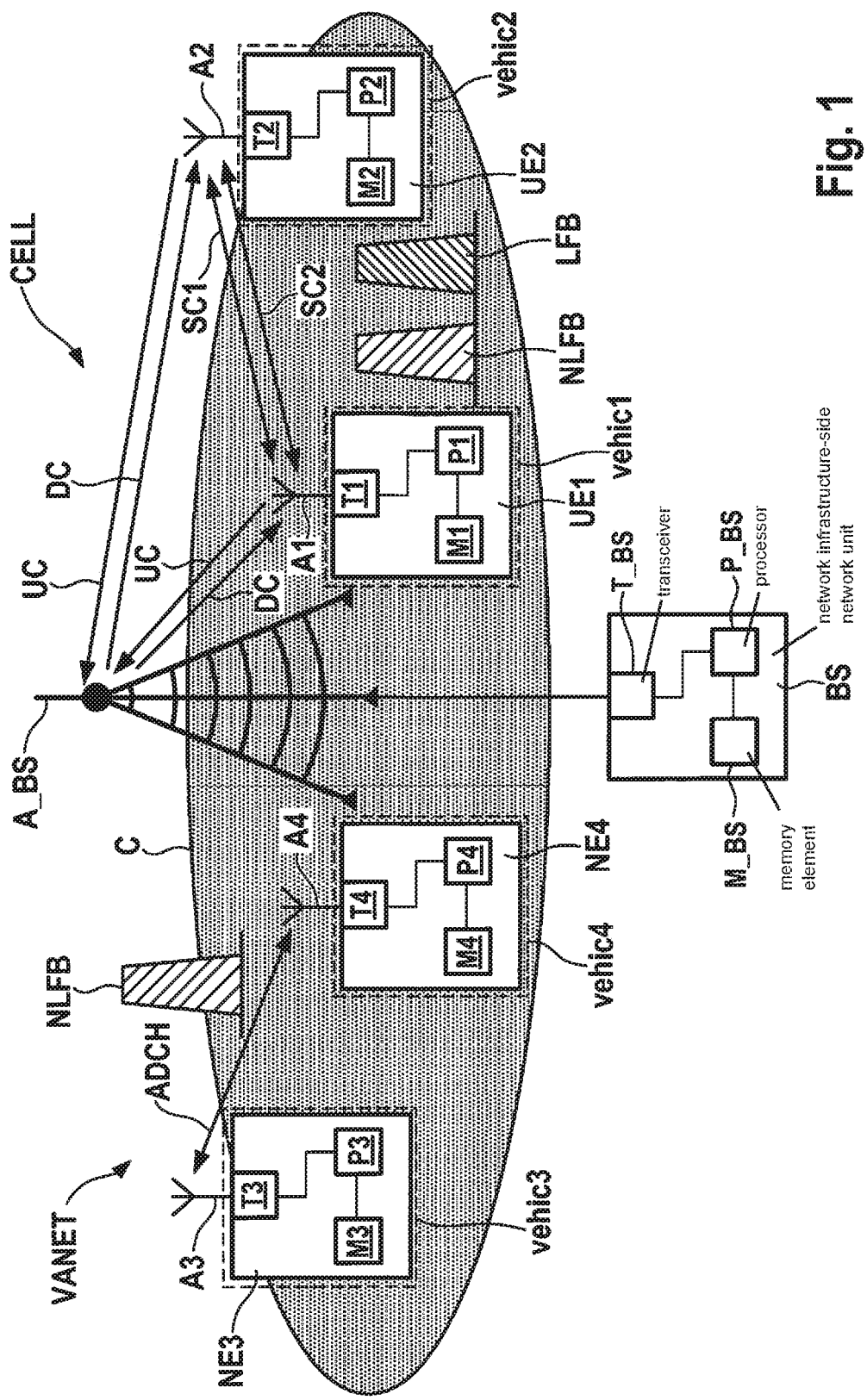
FIG. 1 shows a first cell-based wireless communications network and a second wireless communications network.

FIG. 1 shows a first cell-based wireless communications network CELL and a second wireless communications network VANET. First wireless communications network CELL includes a network infrastructure-side network unit BS, a first roadside network unit UE1, and a second roadside network unit UE2. Network infrastructure-side network unit BS includes a processor P_BS, a memory element M_BS, and a transceiver T_BS. Network infrastructure-side network unit BS may also be referred to as a base station or eNodeB. Network infrastructure-side network unit BS is connected to a stationary antenna A_BS in order to transmit data on a downlink channel DC and to receive data on an uplink channel UC. Antenna A_BS includes, for example, a number of antennas and is designed as a remote radio head (RRH), for example. Network infrastructure-side network unit BS and antenna A_BS provide a cell C within which roadside network units UE1 and UE2 communicate with network unit BS. Of course, network infrastructure-side network unit BS may also have a distributed design within the scope of a virtualization, and may be made up of separate network units. Network units BS, UE1, and UE2 are configured according to the LTE-V2X standard, for example.

Roadside network units UE1 and UE2 respectively include a processor P1, P2, a memory element M1, M2, a transceiver T1, T2, and an antenna A1, A2. The two roadside network units UE1, UE2 are situated within cell C, receive data on downlink channel DC, and send data on uplink channel UC. The two roadside network units UE1, UE2 may communicate directly with one another in an unlicensed frequency range NLFB via a first sidelink channel SC1 and in a licensed frequency range LFB via a second sidelink channel SC2.

The two roadside network units UE1, UE2 are situated within cell C, and are able to receive data on downlink channel DC and to send data on uplink channel UC. The two roadside network units UE1, UE2 are able to communicate directly with one another in an unlicensed frequency range NLFB via a sidelink channel SC1 and in a licensed frequency range LFB via a sidelink channel SC2.

National authorities such as the Federal Network Agency of the Federal Republic of Germany create a frequency usage plan that includes, for example, licenses for a particular network operator. Under the terms of the assigned license, the network operator is allowed to utilize the network infrastructure and terminals in an assigned, i.e., licensed, frequency range or frequency spectrum. In contrast, there are frequency ranges or frequency spectra that are not assigned to a network operator, and that are freely usable under certain criteria such as reduced transmission/reception power output.

In the present description, reference is made to a single uplink channel and a single downlink channel. For example, the uplink channel and the downlink channel each include subchannels; i.e., multiple channels may be used in the uplink and in the downlink. The same applies for sidelink channels SC1, SC2.

Second wireless communications network VANET includes two further roadside network units NE3 and NE4 that respectively include a processor P3, P4, a memory element M3, M4, a transceiver T3, T4, and an antenna A3, A4. Network units NE3 and NE4 are configured according to the IEEE 802.11p standard, for example. Network units NE3 and NE4 communicate directly with one another in unlicensed frequency range NLFB via an ad hoc channel ADCH. Ad hoc channel ADCH is arbitrated by transceivers T3, T4 via a carrier sense multiple access/collision avoidance (CSMA/CA) protocol.

Computer programs are stored on each of memory elements M1, M2, M3, M4, and when executed on respective processor P1, P2, P3, P4 they implement the method provided in this description. Alternatively, processors P1, P2, P3, P4 are implemented as ASICs.

Third and fourth network units NE3 and NE4 are situated in the vicinity of the two first and second network units UE1 and UE2, in particular within an area of cell C, so that the particular transmission power output is sufficient to interfere with a transmission of network units UE1 and UE2 in unlicensed frequency range NLFB. As a result, transmissions on channels ADCH and SC1 may mutually adversely affect one another. The objective of the present description is to reduce this mutually adverse effect.

Sidelink channels SC1 and SC2 are operated in a so-called managed mode, which means that network unit BS controls the transmission on sidelink channels SC1 and SC2 via corresponding messages in downlink channel DC. In contrast, ad hoc channel ADCH is not operated in a managed mode. Roadside network units NE3, NE4 thus automatically access ad hoc channel ADCH.

Roadside network units UE1, UE2, NE3, and NE4 are situated in motor vehicles vehic1, vehic2, vehic3, vehic4, respectively, and are connected to a control unit for data exchange, not shown, respectively situated therein. Alternatively, roadside network units UE1, UE2, NE3, and NE4 are part of the control unit in motor vehicle vehic1, vehic2, vehic3, vehic4, respectively. In another alternative specific embodiment, roadside network units UE1, UE2, NE3, and NE4 are situated in a stationary infrastructure such as a traffic light instead of in a motor vehicle.

Sidelink channels SC1, SC2 and a sidelink are generally defined, for example, by the document "3GPP TS 36.300 V14.2.0 (2017-03)," which is incorporated herein by reference in its entirety into the present description. The sidelink includes sidelink discovery, sidelink communication, and V2X sidelink communication between network units UE1, UE2. The sidelink uses uplink resources and a physical channel structure similarly as for the uplink. Thus, the sidelink differs from the uplink with regard to the physical channel.

The sidelink is limited to individual cluster transmissions for the physical sidelink channels. In addition, the sidelink uses a one-symbol gap at the end of each sidelink subframe.

For the V2X sidelink communication, physical sidelink control channel (PSCCH) and physical sidelink shared channel (PSSCH) are transmitted in the same subframe. Sidelink channels SC1, SC2 are the PSSCH, for example.

The physical layer processing of transport channels in the sidelink differs from the uplink transmission in the following steps: scrambling: for physical sidelink discovery channel (PSDCH) and PSCCH the scrambling is not specific for the network unit; modulation: 64 quadrature amplitude modulation (QAM) and 256 QAM are not supported for the sidelink. The PSCCH indicates sidelink resources and other transmission parameters that are used by particular network unit UE1, UE2 for the PSSCH.

For the PSDCH, PSCCH, and PSSCH demodulation, reference signals similar to the uplink demodulation reference signals are transmitted in the fourth symbol of the slot in normal cyclic prefix CP, and in the third symbol of the slot in expanded CP. The sidelink demodulation reference signal sequence length corresponds to the size (number of subcarriers) of the associated resource. For the V2X sidelink communication, reference signals are transmitted in the third and sixth symbols of the first slot and in the second and fifth symbols of the second slot in the CP. For PSDCH and PSCCH, reference signals based on a fixed base sequence, cyclic shift, and orthogonal cover code are generated. For the V2X sidelink communication, the cyclic shift for PSCCH is randomly selected for each transmission.

For measurements of particular sidelink channel SC1, SC2, the following options are available on the side of network units UE1, UE2: reception power output of the sidelink reference signal (S-RSRP); reception power output of the sidelink discovery reference signal (SD-RSRP); reception power output of the PSSCH reference signal (PSSCH-RSRP); signal strength indicator for sidelink reference signals (S-RSSI).

Ad hoc channel ADCH and ad hoc wireless communications network VANET are defined by the IEEE 802.11p-2010 standard "IEEE standard for information technology—Local and metropolitan area networks—Specific requirements—Part 11: Wireless LAN medium access control (MAC) and physical layer (PHY) specifications, Amendment 6: Wireless access in vehicular environments," which is incorporated herein by reference in its entirety into the present description. IEEE 802.11p is a standard for enhancement of the WLAN IEEE 802.11 standard. The objective of IEEE 802.11p is to establish the WLAN technology in passenger vehicles and provide a reliable interface for applications for intelligent transport systems (ITSs). IEEE 802.11p is also the basis for dedicated short-range communication (DSRC) in the frequency band of 5.85 to 5.925 GHz.

To avoid confusion with the European DSRC version, the term ITS-G5 is used instead of DSRC, in particular in Europe.

The document "ETSI EN 302 663 V1.2.0 (2012-11)," which is incorporated herein by reference in its entirety into the present description, describes both lowermost layers of the ITS-G5 technology (ITS G5: intelligent transport systems operating in the 5 GHz frequency band), the physical layer, and the data link layer. Transceivers TA1 and TA3 implement these two lowermost layers and corresponding functions, for example, according to "ETSI TS 102 687 V1.1.1 (2011-07)" in order to use ad hoc channel ADCH. For use of ad hoc channel ADCH, in Europe the following unlicensed frequency ranges are available which are part of unlicensed frequency range NLFB: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for the operation of ITS applications in the frequency range of 5.905 GHz to 5.925 GHz. ITS-G5 allows communication between the two network units UE1 and UE2 outside the context of a base station. ITS-G5 allows the immediate exchange of data frames, and avoids management overhead used in setting up a network.

The document "ETSI TS 102 687 V1.1.1 (2011-07)," which is incorporated herein by reference in its entirety into the present description, describes a decentralized congestion control mechanism for ITS-G5. Ad hoc channel ADCH is used, among other things, for the exchange of data concerning traffic safety and traffic efficiency. Transceivers TA1 and TA3 implement, for example, the functions described in the document "ETSI TS 102 687 V1.1.1 (2011-07)." The applications and services in ITS-G5 are based on the cooperative behavior of the roadside network units that form the vehicular ad hoc network (VANET). Ad hoc network VANET allows time-critical road traffic applications in which rapid information exchange is necessary to warn and assist the driver and/or the vehicle in a timely manner. To ensure proper functioning of ad hoc network VANET, the decentralized congestion control (DCC) mechanism for ad hoc channel ADCH is used by ITS-G5. DCC includes functions that are situated on multiple layers of the ITS architecture. The DCC mechanisms are based on knowledge concerning the channel. The channel status information is obtained by channel sounding. Channel status information may be obtained via the transmit power control (TPC), transmit rate control (TRC), and transmit data rate control (TDC) methods. The methods ascertain the channel status information as a function of reception signal level thresholds or preamble information of detected packets.

Figure 2:
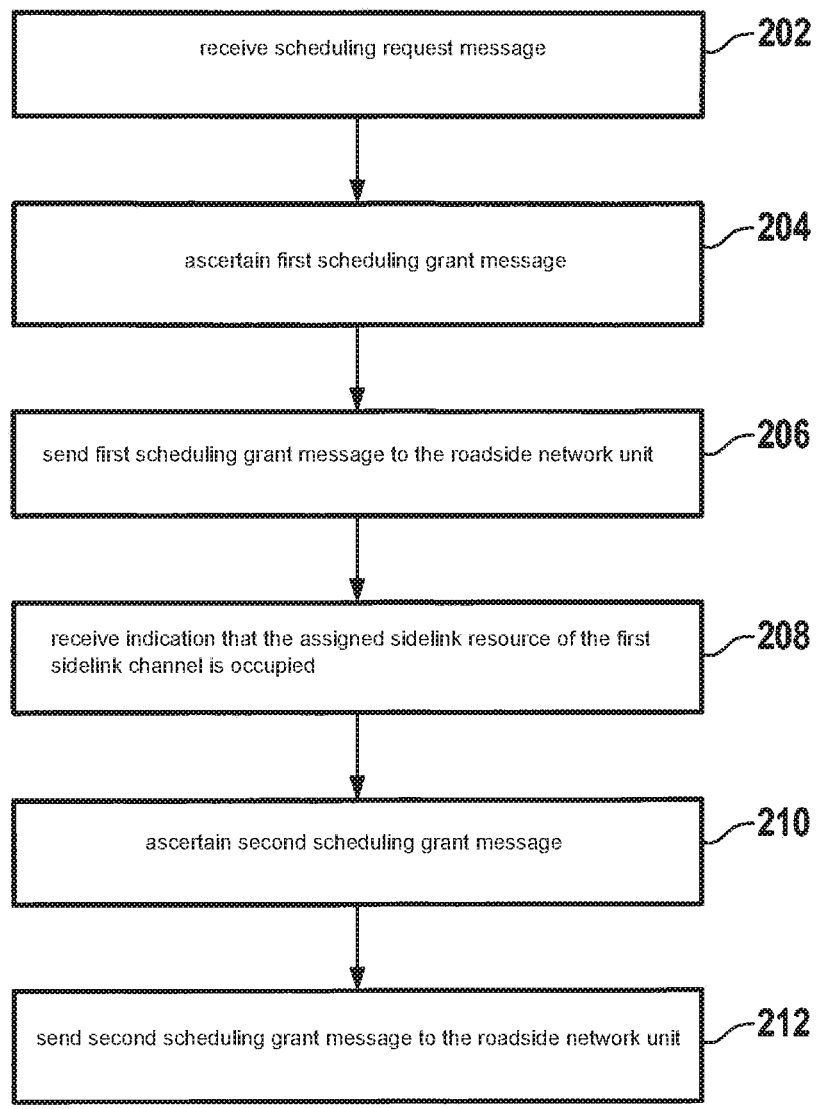
FIGS. 2, 3, 5, 8, and 9 each show a schematic flow chart in accordance with the present invention.

FIG. 2 shows a schematic flow chart for operating network infrastructure-side network unit BS. A scheduling request message for the first sidelink channel in the unlicensed frequency range is received by one of the roadside network units on the uplink channel in a step 202. A first scheduling grant message is ascertained in a step 204, the first scheduling grant message including an assignment of at least one sidelink resource of the first sidelink channel to the roadside network unit. The first scheduling grant message on the downlink channel is sent to the roadside network unit in a step 206. An indication that the assigned sidelink resource of the first sidelink channel is occupied is received by the roadside network unit on the uplink channel in a step 208. A second scheduling grant message is ascertained in a step 210, the second scheduling grant message including an assignment of at least one sidelink resource of the second sidelink channel in the licensed frequency range to the roadside network unit. The second scheduling grant message is sent to the roadside network unit on the downlink channel in a step 212.

Figure 3:
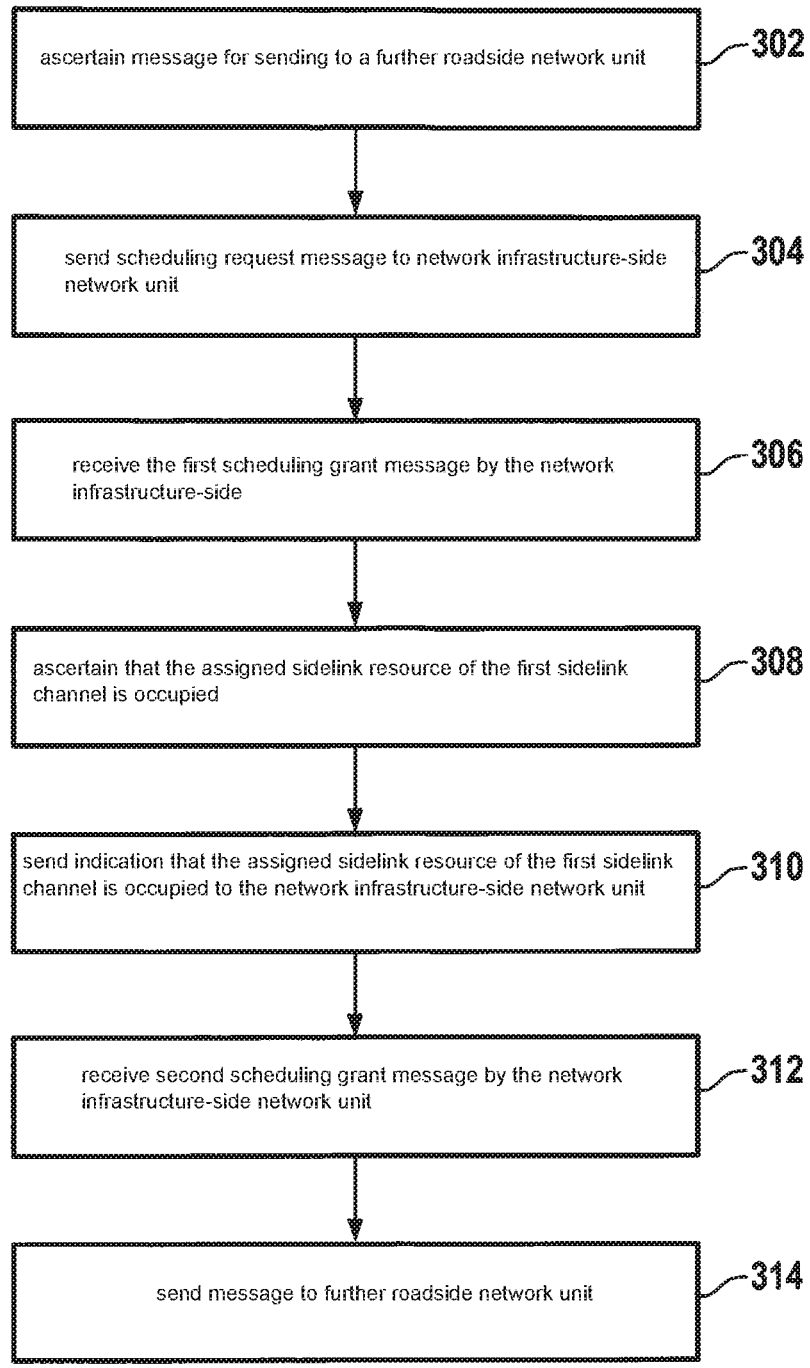

FIG. 3 shows a schematic flow chart for operating roadside network unit UE1 or UE2. A message for sending to a further roadside network unit is ascertained in a step 302. A scheduling request message for the first sidelink channel in the unlicensed frequency range is sent to the network infrastructure-side network unit on the uplink channel in a step 304. The first scheduling grant message on the downlink channel is received by the network infrastructure-side network unit in a step 306, the first scheduling grant message including an assignment of at least one sidelink resource of the first sidelink channel to the roadside network unit. It is ascertained in a step 308 that the assigned sidelink resource of the first sidelink channel is occupied. An indication that the assigned sidelink resource of the first sidelink channel is occupied is sent to the network infrastructure-side network unit on the uplink channel in a step 310. The second scheduling grant message is received by the network infrastructure-side network unit on the downlink channel in a step 312, the second scheduling grant message including an assignment of at least one sidelink resource of the second sidelink channel to the roadside network unit. The message is sent to the further roadside network unit on the second sidelink channel in a step 314.

Figure 4:
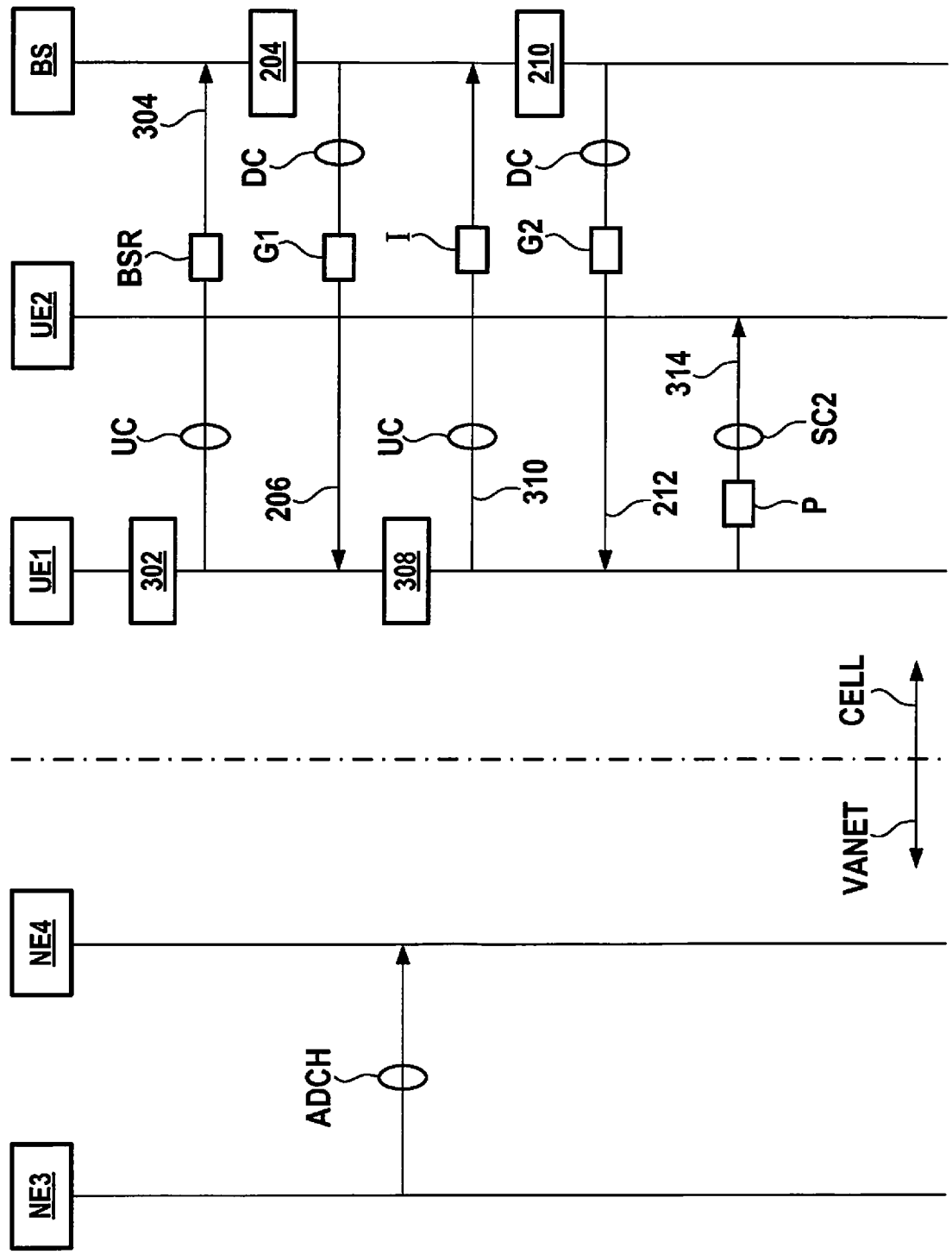
FIGS. 4 and 6 each show a schematic sequence diagram in accordance with the present invention.

FIG. 4 shows a schematic sequence diagram. A message P in the form of useful data is ascertained by roadside network unit UE1 in step 302 in order to send it in a scheduled resource. Scheduling request message BSR, for example a buffer status report, is sent to network infrastructure-side network unit BS via uplink channel UC. In step 204, network infrastructure-side network unit BS ascertains scheduling grant message G1, which is sent to first network unit UE1 on downlink channel DC. After receiving scheduling grant message G1, network unit UE1 attempts to transmit message P according to a "listen before talk" (LBT) method in step 308. If network unit UE1 determines that the first sidelink channel is free, it transmits message P via the assigned resource of the first sidelink channel. For this purpose, network unit UE1 will query the first sidelink channel to ascertain whether or not it is occupied.

In the present description, a resource is understood to mean a piece of time information, frequency information, and/or modulation and coding scheme information that is used for transmission on one of the channels and is previously scheduled by the network infrastructure-side network unit.

If a communication between network units NE3 and NE4 via ad hoc channel ADCH takes place in the same frequency range at the point in time that network unit UE1 is listening to the channel, network unit UE1 assumes from the channel measurement that the first sidelink channel, present on the same frequency range, is occupied. Indication I, which is present as bit information, for example, indicates that first roadside network unit UE1 was not able to utilize its assigned resources. Indication I is transmitted to network infrastructure-side network unit BS via uplink channel UC in step 310. Network infrastructure-side network unit BS ascertains second grant scheduling message G2 as a function of indication I in step 210 and transmits it to first roadside network unit UE1 via downlink channel DC. First roadside network unit UE1 sends message P with increased reliability via the assigned resources of second sidelink channel SC2 in step 314, since second sidelink channel SC2 is in licensed frequency range LSB and therefore no interferences from other unscheduled network units are to be expected.

Consequently, second sidelink channel SC2 is used as a backup channel for the first sidelink channel.

Figure 5:
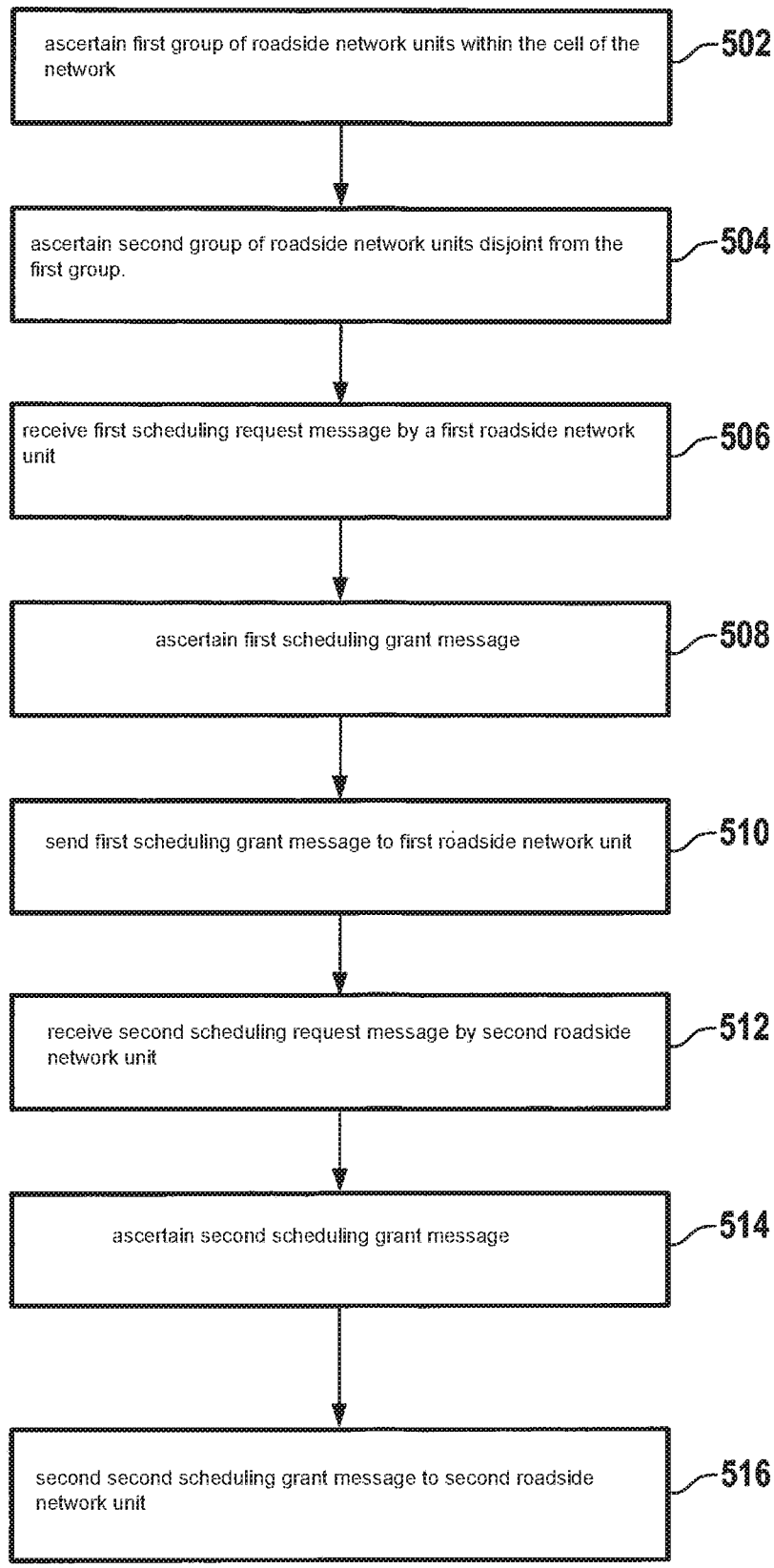

FIG. 5 shows a schematic flow chart for operating network infrastructure-side network unit BS from FIG. 1. A first group of roadside network units within the cell of the network infrastructure-side network unit is ascertained in a step 502. A second group of roadside network units within the cell of the network infrastructure-side network unit is ascertained in a step 504, the first group and the second group being disjoint. A first scheduling request message is received by a first roadside network unit of the first group on the uplink channel in a step 506. A first scheduling grant message is ascertained in a step 508, the first scheduling grant message including an assignment of at least one sidelink resource of the first sidelink channel in the unlicensed frequency range to the first roadside network unit of the first group. The first scheduling grant message is sent to the first roadside network unit on a downlink channel in a step 510. A second scheduling request message is received by a second roadside network unit of the second group on the uplink channel in a step 512. A second scheduling grant message is ascertained in a step 514, the second scheduling grant message including an assignment of at least one sidelink resource of the second sidelink channel in the licensed frequency range to the second roadside network unit of the second group. The second scheduling grant message is sent to the second roadside network unit on the downlink channel in a step 516.

Figure 6:
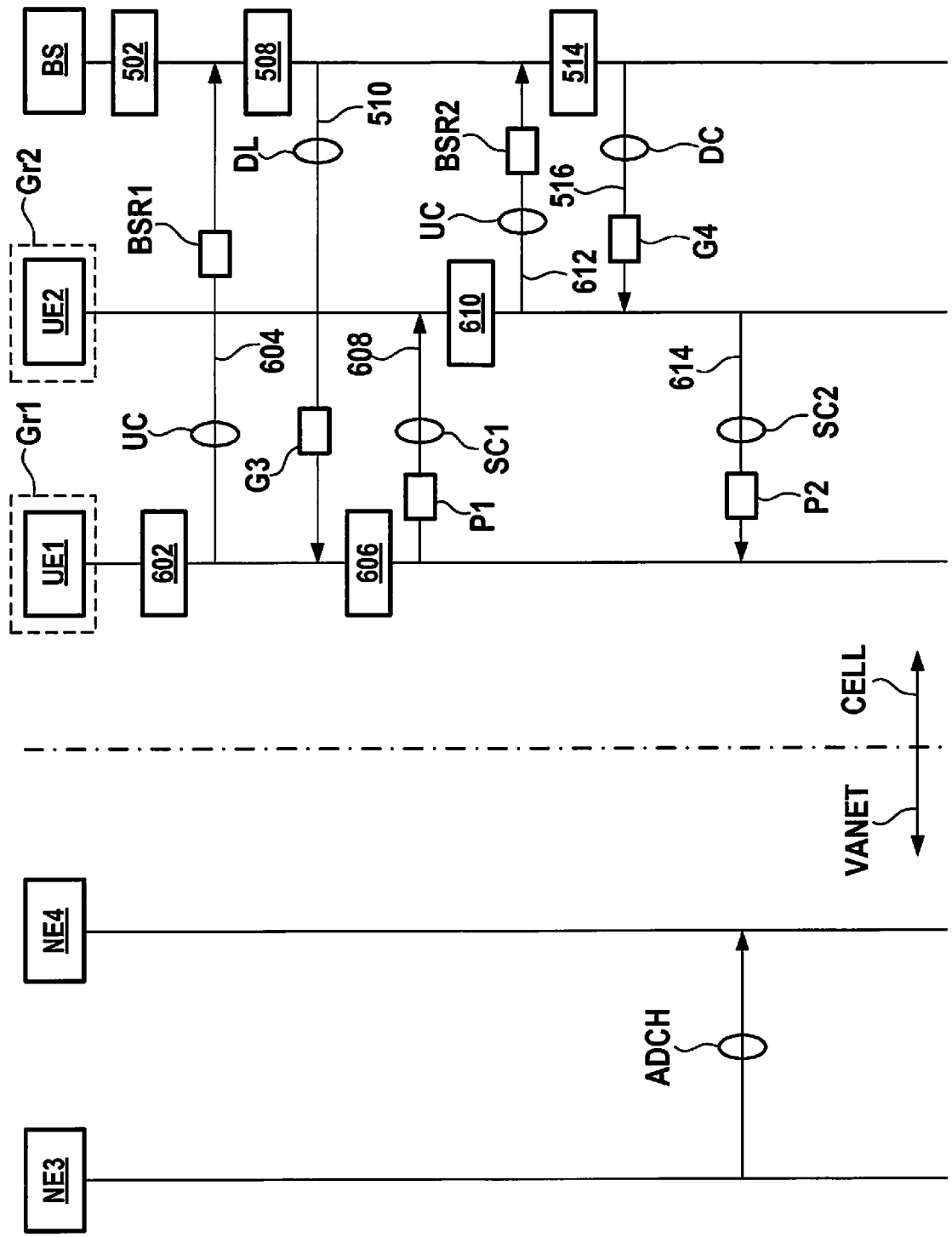

FIG. 6 shows a schematic sequence diagram. Network unit BS divides roadside network units UE1 and UE2 into groups Gr1, Gr2, respectively, in step 502. Of course, groups Gr1 and Gr2 also include further roadside network units. Roadside network unit UE1 ascertains useful data P1 for sending to second roadside network unit UE2 in a step 602, and for this purpose transmits first scheduling request message BSR1 to network infrastructure-side network unit BS on uplink channel UC in a step 604. Network unit BS ascertains first scheduling grant message G3 in step 508 in order to send it on downlink channel DC in step 510. First network unit UE1 checks whether first sidelink channel SC1 is free in a step 606. In the present situation this is the case, and first network unit UE1 sends useful data P1 to second roadside network unit UE2 on first sidelink channel SC1 of the unlicensed frequency range in a step 608.

Second roadside network unit UE2 ascertains useful data P2 in a step 610 in order to send them to first roadside network unit UE1. For this purpose, first roadside network unit UE1 sends second scheduling request message BSR2 to network infrastructure-side network unit BS via uplink channel UC in a step 612. Network unit BS ascertains second scheduling grant message G4 for second sidelink channel SC2, based on second scheduling request message BSR2, in step 514, and sends it to second roadside network unit UE2 in step 516. After receiving second scheduling grant message G4, second roadside network unit UE2 does not carry out a listen before talk method, but instead sends useful data P2 to first roadside network unit UE1 on the resources assigned by second scheduling grant message G4 on second sidelink channel SC2 in a step 614. A simultaneous wireless communication between roadside network units NE3 and NE4 on ad hoc channel ADCH does not interfere with the communication according to step 614, since the frequency ranges of ad hoc channel ADCH and of second sidelink channel SC2 are different.

Both the first and the second roadside network units UE1 and UE2 receive scheduling grant messages G3 and G4, and thus are ready to receive on first as well as second sidelink channel SC1 and SC2.

Figure 7:
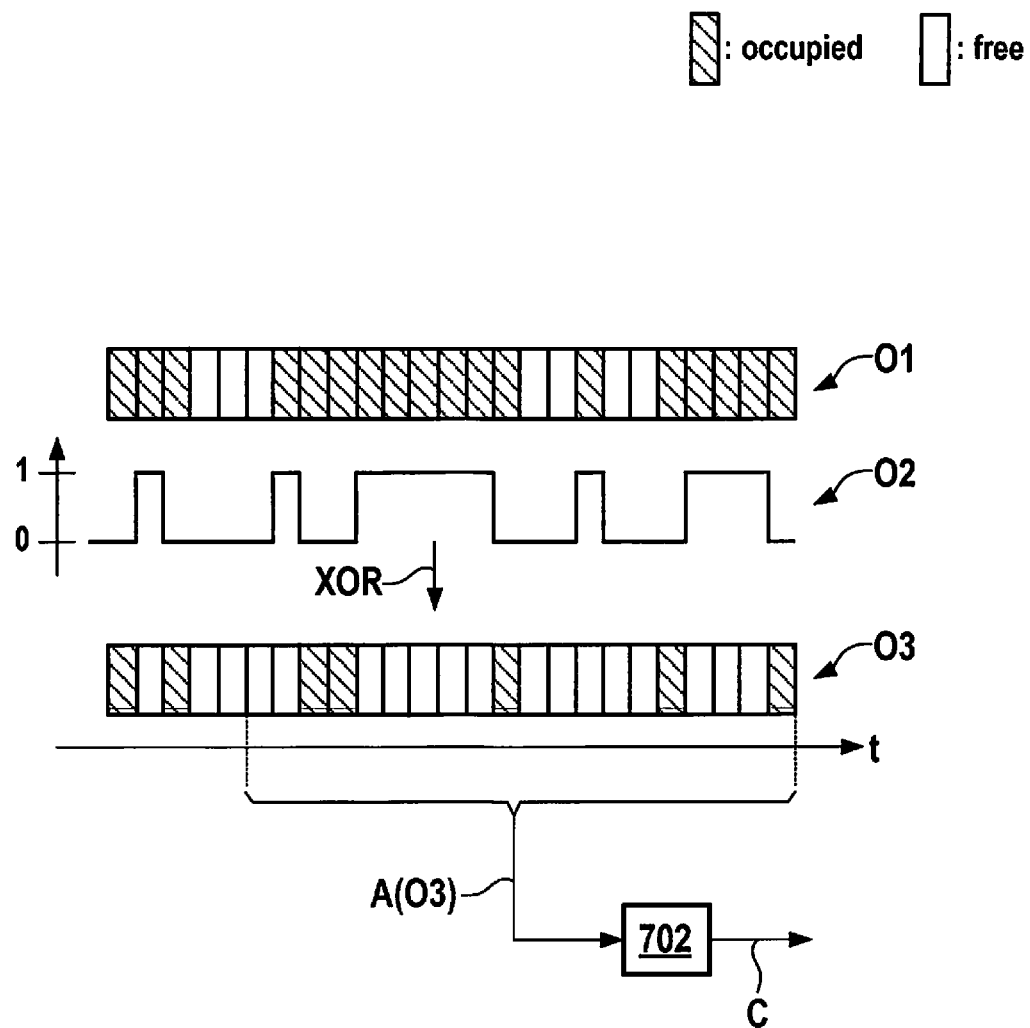
FIG. 7 shows a schematic block diagram for ascertaining a likelihood of a collision.

FIG. 7 shows a schematic block diagram for ascertaining a likelihood of a collision C on first sidelink channel SC1 from FIG. 1. A first piece of occupancy information O1 is ascertained by a channel measurement of network infrastructure-side network unit BS on the first sidelink channel. First piece of occupancy information O1 contains information that potential data traffic, which may originate from cell-based wireless communications network CELL as well as from second wireless communications network VANET, is passing through on the first sidelink channel. In addition, a second piece of occupancy information O2 that contains the resources that are scheduled, i.e., occupied, on the first sidelink channel is known to network infrastructure-side network unit BS via the scheduler. Second piece of occupancy information O2 is present as bit information, for example, where 0 means a free state and 1 means an occupied first sidelink channel. A third piece of occupancy information O3 is obtained via an exclusive OR operation O1 XOR O2. Third piece of occupancy information O3 corresponds to an occupancy of the first sidelink channel by roadside network units NE3, NE4, which do not operate in the cell-based wireless communications network, for example traffic according to ETSI ITS-G5.

The likelihood of a collision C may be subsequently ascertained based on third piece of occupancy information O3. For example, a section A(O3) is selected from occupancy information O3 and the likelihood of a collision C is ascertained according to block 702, which for 5 out of 20 time slots occupied is 25%.

Figure 8:
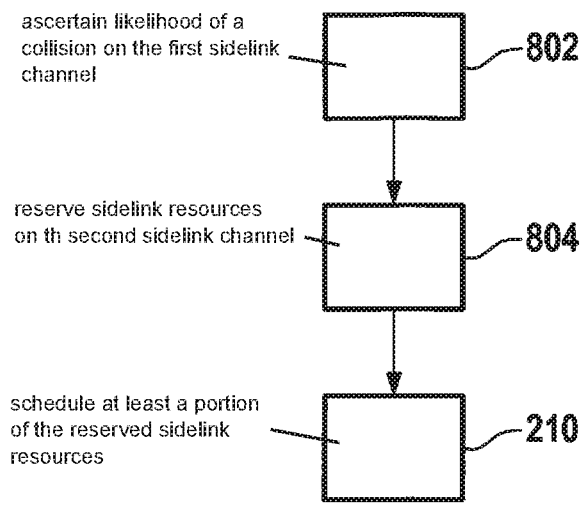

FIG. 8 shows a schematic flow chart for operating network infrastructure-side network unit BS. The likelihood of a collision on the first sidelink channel in the unlicensed frequency range according to FIG. 7, for example, is ascertained in a step 802. Sidelink resources are reserved on the second sidelink channel as a function of the ascertained likelihood of a collision in a step 804. For example, if a 20% likelihood of a collision has been ascertained and ten roadside network units of the cell-based wireless network are present in the cell, for example two resources are reserved on the second sidelink channel. At least a portion of the reserved sidelink resources are scheduled in step 210; i.e., a sidelink resource of the second sidelink channel is assigned to the roadside network unit that was not able to transmit its data in the first sidelink channel.

The ascertained reserved and/or scheduled resources in the first and second sidelink channels are distributed to first and second network units UE1 and UE2 by network infrastructure-side network unit BS, for example by broadcasting, in particular with the aid of resource control messages. This may also take place during a cell attachment operation of a hand-over operation of roadside network units UE1, UE2.

Figure 9:
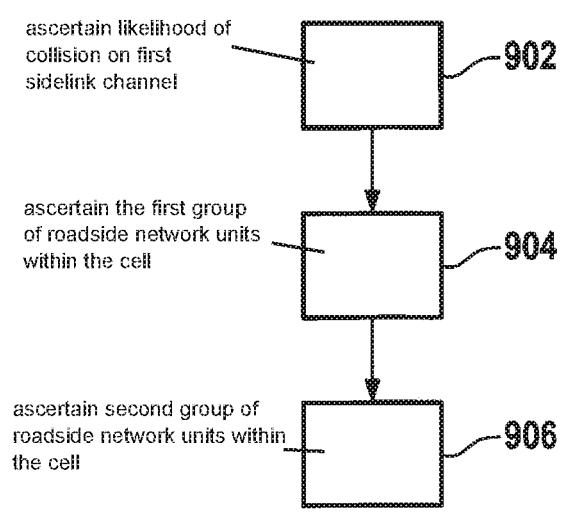

FIG. 9 shows a schematic flow chart for operating network infrastructure-side network unit BS. The likelihood of a collision on the first sidelink channel according to FIG. 7, for example, is ascertained in step 902. The first group of roadside network units within the cell is ascertained as a function of the ascertained likelihood of a collision in a step 904. The second group of roadside network units within the cell is ascertained as a function of the ascertained likelihood of a collision in a step 906. The groups are adapted to the occupancy rate of the first sidelink channel in this way.

For example, if at a first point in time the likelihood of a collision was 0% and the number of roadside network units was ten, associated with the first group for transmission on the first sidelink channel in the unlicensed frequency range [sic]. If the likelihood of a collision now increases to 20% at a second point in time, two roadside network units are associated with the second group for transmission on the second sidelink channel in the licensed frequency range. Eight network units are associated with the first group. If the likelihood of a collision subsequently decreases again, the roadside network units are transferred from the second group into the first group. This ensures that the first sidelink channel in the unlicensed frequency range is at preferably full capacity.

Further aspects of the present description are described in the following paragraphs:

(Paragraph 1) A method for operating a network infrastructure-side network unit of a cell-based wireless communications network, the method including: receiving a scheduling request message for a first sidelink channel in an unlicensed frequency range from a roadside network unit on an uplink channel; ascertaining a first scheduling grant message, the first scheduling grant message including an assignment of at least one sidelink resource of the first sidelink channel to the roadside network unit; sending the first scheduling grant message to the roadside network unit on a downlink channel; receiving from the roadside network unit on the uplink channel an indication that the assigned sidelink resource of the first sidelink channel is occupied; ascertaining a second scheduling grant message, the second scheduling grant message including an assignment of at least one sidelink resource of a second sidelink channel in a licensed frequency range to the roadside network unit; and sending the second scheduling grant message to the roadside network unit on the downlink channel.

(Paragraph 2) The method according to Paragraph 1, including: reserving sidelink resources on the second sidelink channel in the licensed frequency range.

(Paragraph 3) The method according to Paragraph 1 or 2, including: ascertaining a likelihood of a collision on the first sidelink channel in the unlicensed frequency range; and reserving the sidelink resources on the second sidelink channel in the licensed frequency range as a function of the likelihood of a collision.

(Paragraph 4) A network infrastructure-side network unit of a cell-based wireless communications network, including: an antenna and a transceiver that are configured to receive a scheduling request message for a first sidelink channel in an unlicensed frequency range from a roadside network unit on an uplink channel; a processor that is configured to ascertain a first scheduling grant message, the first scheduling grant message including an assignment of at least one sidelink resource of the first sidelink channel to the roadside network unit; the antenna and the transceiver being configured to send the first scheduling grant message to the roadside network unit on a downlink channel, and to receive from the roadside network unit on the uplink channel an indication that the assigned sidelink resource of the first sidelink channel is occupied; the processor being configured to ascertain a second scheduling grant message, the second scheduling grant message including an assignment of at least one sidelink resource of a second sidelink channel in a licensed frequency range to the roadside network unit; and the antenna and the transceiver being configured to send the second scheduling grant message to the roadside network unit on the downlink channel.

(Paragraph 5) A method for operating a roadside network unit of a cell-based wireless communications network, the method including: ascertaining a message for sending to a further roadside network unit; sending a scheduling request message for a first sidelink channel in an unlicensed frequency range to a network infrastructure-side network unit on an uplink channel; receiving a first scheduling grant message from the network infrastructure-side network unit on a downlink channel, the first scheduling grant message including an assignment of at least one sidelink resource of the first sidelink channel to the roadside network unit; ascertaining that the assigned sidelink resource of the first sidelink channel is occupied; sending to the network infrastructure-side network unit on the uplink channel an indication that the assigned sidelink resource of the first sidelink channel is occupied; receiving a second scheduling grant message from the network infrastructure-side network unit on the downlink channel, the second scheduling grant message including an assignment of at least one sidelink resource of the second sidelink channel to the roadside network unit; and sending the message to the further roadside network unit on the second sidelink channel.

(Paragraph 6) A method for operating a cell-based wireless communications network according to one of Paragraphs 1 through 3 and Paragraph 5.

(Paragraph 7) A roadside network unit of a cell-based wireless communications network, including: a processor that is configured to ascertain a message for sending to a further roadside network unit; an antenna and a transceiver that are configured to send a scheduling request message for a first sidelink channel in an unlicensed frequency range to a network infrastructure-side network unit on an uplink channel, and to receive a first scheduling grant message from the network infrastructure-side network unit on a downlink channel, the first scheduling grant message including an assignment of at least one sidelink resource of the first sidelink channel to the roadside network unit; the transceiver and/or the processor being configured to ascertain that the assigned sidelink resource of the first sidelink channel is occupied; the antenna and the transceiver being configured to send to the network infrastructure-side network unit on the uplink channel an indication that the assigned sidelink resource of the first sidelink channel is occupied, and to receive a second scheduling grant message from the network infrastructure-side network unit on the downlink channel, the second scheduling grant message sending an assignment of at least one sidelink resource of the second sidelink channel to the roadside network unit, and sending the message to the further roadside network unit on the second sidelink channel.

(Paragraph 8) A motor vehicle that includes the roadside network unit according to Paragraph 7.

(Paragraph 9) A method for operating a network infrastructure-side network unit of a cell-based wireless communications network, the method including: ascertaining a first group of roadside network units within a cell of the network infrastructure-side network unit; ascertaining a second group of roadside network units within the cell of the network infrastructure-side network unit, the first group and the second group being disjoint; receiving a first scheduling request message from a first roadside network unit of the first group on an uplink channel; ascertaining a first scheduling grant message, the first scheduling grant message including an assignment of at least one sidelink resource of a first sidelink channel in an unlicensed frequency range to the first roadside network unit of the first group; sending the first scheduling grant message to the first roadside network unit on a downlink channel; receiving a second scheduling request message from a second roadside network unit of the second group on the uplink channel; ascertaining a second scheduling grant message, the second scheduling grant message including an assignment of at least one sidelink resource of a second sidelink channel in a licensed frequency range to the second roadside network unit of the second group; and sending the second scheduling grant message to the second roadside network unit on a downlink channel.

(Paragraph 10) The method according to Paragraph 9, including: ascertaining a likelihood of a collision on the first sidelink channel in the unlicensed frequency range; ascertaining the first group of roadside network units within a cell of the network infrastructure-side network unit as a function of the ascertained likelihood of a collision; ascertaining the second group of roadside network units within the cell of the network infrastructure-side network unit as a function of the ascertained likelihood of a collision.

(Paragraph 11) A network infrastructure-side network unit of a cell-based wireless communications network, including: a processor that is configured to ascertain a first group of roadside network units within a cell of the network infrastructure-side network unit, and to ascertain a second group of roadside network units within the cell of the network infrastructure-side network unit, the first group and the second group being disjoint; an antenna and a transceiver that are configured to receive a first scheduling request message from a first roadside network unit of the first group on an uplink channel; the processor being configured to ascertain a first scheduling grant message, the first scheduling grant message including an assignment of at least one sidelink resource of a first sidelink channel in an unlicensed frequency range to the first roadside network unit of the first group; the antenna and the transceiver being configured to send the first scheduling grant message to the first roadside network unit on a downlink channel, and to receive a second scheduling request message from a second roadside network unit of the second group on the uplink channel; the processor being configured to ascertain a second scheduling grant message, the second scheduling grant message including an assignment of at least one sidelink resource of a second sidelink channel in a licensed frequency range to the second roadside network unit of the second group; and the antenna and the transceiver being configured to send the second scheduling grant message to the second roadside network unit on a downlink channel.

What is claimed is:

1. A method for operating a base station of a cell-based wireless communications network, the method comprising the following steps:
   receiving a scheduling request message for a first sidelink channel in an unlicensed frequency range from a user equipment (UE) on an uplink channel;
   ascertaining a first scheduling grant message, the first scheduling grant message including an assignment of at least one sidelink resource of the first sidelink channel to the UE;
   sending the first scheduling grant message to the UE on a downlink channel;
   receiving, from the UE on the uplink channel, an indication that the assigned sidelink resource of the first sidelink channel is occupied;
   ascertaining a second scheduling grant message, the second scheduling grant message including an assignment of at least one sidelink resource of a second sidelink channel in a licensed frequency range to the UE;
   sending the second scheduling grant message to the UE on the downlink channel;
   ascertaining a likelihood of a collision on the first sidelink channel in the unlicensed frequency range; and
   reserving sidelink resources on the second sidelink channel in the licensed frequency range as a function of the likelihood of a collision.

2. A base station of a cell-based wireless communications network, comprising:
   an antenna and a transceiver that are configured to receive a scheduling request message for a first sidelink channel in an unlicensed frequency range from a user equipment (UE) on an uplink channel; and
   a processor that is configured to ascertain a first scheduling grant message, the first scheduling grant message including an assignment of at least one sidelink resource of the first sidelink channel to the UE;
   wherein the antenna and the transceiver are configured to send the first scheduling grant message to the UE on a downlink channel, and to receive from the UE on the uplink channel an indication that the assigned sidelink resource of the first sidelink channel is occupied;
   wherein the processor is configured to ascertain a second scheduling grant message, the second scheduling grant message including an assignment of at least one sidelink resource of a second sidelink channel in a licensed frequency range to the UE;
   wherein the antenna and the transceiver are configured to send the second scheduling grant message to the UE on the downlink channel;
   wherein the processor is configured to ascertain a likelihood of a collision on the first sidelink channel in the unlicensed frequency range, and reserve the sidelink resources on the second sidelink channel in the licensed frequency range as a function of the likelihood of a collision.

3. A method for operating a user equipment (UE) of a cell-based wireless communications network, the method comprising the following steps:
   ascertaining a message for sending to a further UE;
   sending a scheduling request message for a first sidelink channel in an unlicensed frequency range to a it base station on an uplink channel;
   receiving a first scheduling grant message from the base station on a downlink channel, the first scheduling grant message including an assignment of at least one sidelink resource of the first sidelink channel to the UE;
   ascertaining that the assigned sidelink resource of the first sidelink channel is occupied;
   sending to the base station on the uplink channel an indication that the assigned sidelink resource of the first sidelink channel is occupied;
   receiving a second scheduling grant message from the base station on the downlink channel, the second scheduling grant message including an assignment of at least one sidelink resource of the second sidelink channel to the UE; and
   sending the message to the further UE on the second sidelink channel;
   wherein the base station performs:
   ascertaining a likelihood of a collision on the first sidelink channel in the unlicensed frequency range, and
   reserving sidelink resources on the second sidelink channel in the licensed frequency range as a function of the likelihood of a collision.

4. A method for operating a cell-based wireless communications network, comprising the following steps:
   receiving, by a base station of the cell-based wireless communications network, a scheduling request message for a first sidelink channel in an unlicensed frequency range from a user equipment (UE) on an uplink channel;
   ascertaining, by the base station, a first scheduling grant message, the first scheduling grant message including an assignment of at least one sidelink resource of the first sidelink channel to the UE;
   sending, by the base station, the first scheduling grant message to the UE on a downlink channel;
   receiving, from the UE on the uplink channel, an indication that the assigned sidelink resource of the first sidelink channel is occupied;
   ascertaining, by the base station, a second scheduling grant message, the second scheduling grant message including an assignment of at least one sidelink resource of a second sidelink channel in a licensed frequency range to the UE;

sending, by the base station, the second scheduling grant message to the UE on the downlink channel;
ascertaining, by the UE of the cell-based wireless communications network, a message for sending to a further UE;
sending, by the UE, the scheduling request message for the first sidelink channel in the unlicensed frequency range to the base station on the uplink channel;
receiving, by the UE, the first scheduling grant message from the base station on the downlink channel, the first scheduling grant message including the assignment of the at least one sidelink resource of the first sidelink channel to the UE;
ascertaining, by the UE, that the assigned sidelink resource of the first sidelink channel is occupied;
sending, by the UE, to the base station on the uplink channel the indication that the assigned sidelink resource of the first sidelink channel is occupied;
receiving, by the UE, the second scheduling grant message from the base station on the downlink channel, the second scheduling grant message including the assignment of the at least one sidelink resource of the second sidelink channel to the UE; and
sending, by the UE, the message to the further UE on the second sidelink channel.

5. A user equipment (UE) of a cell-based wireless communications network, comprising:
a processor that is configured to ascertain a message for sending to a further UE;
an antenna and a transceiver that are configured to send a scheduling request message for a first sidelink channel in an unlicensed frequency range to a base station on an uplink channel, and to receive a first scheduling grant message from the base station on a downlink channel, the first scheduling grant message including an assignment of at least one sidelink resource of the first sidelink channel to the UE;
wherein the transceiver and/or the processor is configured to ascertain that the assigned sidelink resource of the first sidelink channel is occupied;
wherein the antenna and the transceiver are configured to send to the base station on the uplink channel an indication that the assigned sidelink resource of the first sidelink channel is occupied, and to receive a second scheduling grant message from base station on the downlink channel, the second scheduling grant message sending an assignment of at least one sidelink resource of the second sidelink channel to the UE, and sending the message to the further UE on the second sidelink channel; and
wherein the base station is configured to ascertain a likelihood of a collision on the first sidelink channel in the unlicensed frequency range, and reserve the sidelink resources on the second sidelink channel in the licensed frequency range as a function of the likelihood of a collision.

6. A motor vehicle that includes a user equipment (UE) of a cell-based wireless communications network, the UE comprising:
a processor that is configured to ascertain a message for sending to a further UE;
an antenna and a transceiver that are configured to send a scheduling request message for a first sidelink channel in an unlicensed frequency range to a base station on an uplink channel, and to receive a first scheduling grant message from the base station on a downlink channel, the first scheduling grant message including an assignment of at least one sidelink resource of the first sidelink channel to the UE;
wherein the transceiver and/or the processor is configured to ascertain that the assigned sidelink resource of the first sidelink channel is occupied;
wherein the antenna and the transceiver are configured to send to the base station on the uplink channel an indication that the assigned sidelink resource of the first sidelink channel is occupied, and to receive a second scheduling grant message from the it base station on the downlink channel, the second scheduling grant message sending an assignment of at least one sidelink resource of the second sidelink channel to the UE, and sending the message to the further UE on the second sidelink channel; and
wherein the base station is configured to ascertain a likelihood of a collision on the first sidelink channel in the unlicensed frequency range, and reserve the sidelink resources on the second sidelink channel in the licensed frequency range as a function of the likelihood of a collision.

7. A method for operating a base station of a cell-based wireless communications network, the method comprising the following steps:
ascertaining a first group of user equipment (UEs) within a cell of the base station;
ascertaining a second group of UEs within the cell of the base station, the first group and the second group being disjoint;
receiving a first scheduling request message from a first UE of the first group on an uplink channel;
ascertaining a first scheduling grant message, the first scheduling grant message including an assignment of at least one sidelink resource of a first sidelink channel in an unlicensed frequency range to the first UE of the first group;
sending the first scheduling grant message to the first UE on a downlink channel;
receiving a second scheduling request message from a second UE of the second group on the uplink channel;
ascertaining a second scheduling grant message, the second scheduling grant message including an assignment of at least one sidelink resource of a second sidelink channel in a licensed frequency range to the second UE of the second group;
sending the second scheduling grant message to the second UE on a downlink channel;
ascertaining a likelihood of a collision on the first sidelink channel in the unlicensed frequency range;
ascertaining the first group of UEs within the cell of the base station as a function of the ascertained likelihood of a collision;
ascertaining the second group of UEs within the cell of the station as a function of the ascertained likelihood of a collision.

8. A base station of a cell-based wireless communications network, comprising:
a processor that is configured to ascertain a first group of user equipment (UEs) within a cell of the base station, and to ascertain a second group of UEs within the cell of the base station, the first group and the second group being disjoint; and
an antenna and a transceiver that are configured to receive a first scheduling request message from a first UE of the first group on an uplink channel;
wherein the processor is configured to ascertain a first scheduling grant message, the first scheduling grant message including an assignment of at least one sidelink resource of a first sidelink channel in an unlicensed frequency range to the first UE of the first group;

wherein the antenna and the transceiver are configured to send the first scheduling grant message to the first UE on a downlink channel, and to receive a second scheduling request message from a second UE of the second group on the uplink channel;

wherein the processor is configured to ascertain a second scheduling grant message, the second scheduling grant message including an assignment of at least one sidelink resource of a second sidelink channel in a licensed frequency range to the second UE of the second group; and the antenna and the transceiver are configured to send the second scheduling grant message to the second UE on a downlink channel;

wherein the processor is configured to ascertain a likelihood of a collision on the first sidelink channel in the unlicensed frequency range, ascertain the first group of UEs within a cell of the base station as a function of the ascertained likelihood of a collision, and ascertain the second group of UEs within a cell of the base station as a function of the ascertained likelihood of a collision.

* * * * *